Patented Apr. 29, 1941

2,239,997

UNITED STATES PATENT OFFICE 2,239,997

WETTING AGENT

Albert K. Epstein and Morris Katzman, Chicago, Ill., assignors to The Emulsol Corporation, Chicago, Ill., a corporation of Illinois No Drawing. Application September 9, 1938,
Serial No. 229,094

6 Claims. (Cl. 260—404)

Our invention relates to wetting-out compounds and preparations and is particularly concerned with the provision of such products having unusual and unexpected properties of reducing the surface tension of aqueous media.

It has already been proposed to prepare condensation products of alkylolamines and higher molecular weight carboxylic acids as well as salts of said condensation products, as shown, for example, in British Patents Nos. 306,116; 337,737 and 337,774. In general, the temperatures employed in carrying out the condensation reaction are substantially in excess of 100 degrees C., in general, being of the order of 170 degrees C. to 210 degrees C. or somewhat more or less. The compounds resulting from such reactions in general have a dark color and a somewhat disagreeable odor thereby lessening the value thereof in various arts and industries, particularly for use in cosmetic preparations.

In our copending application, Serial No. 143,135, filed May 17, 1937, now Patent No. 2,173,448, issued September 19, 1939, of which the present application is a continuation-in-part, we have disclosed methods whereby the disadvantages of the prior art may be overcome and novel reaction products produced having excellent color and substantial freedom from objectionable odors. In general, the improvements there described comprised carrying out the condensation reaction between the alkylolamine and higher molecular weight carboxylic acid or derivative thereof in the presence of steam, preferably, but not necessarily, under reduced pressure, followed by quick cooling after the completion of the reaction. The process was carried out by passing steam through the reaction mixture while conducting the reaction at a temperature of the order of 240 degrees C. when using a triglyceride as the source of higher molecular weight carboxylic acids. After about twenty or thirty minutes, the reaction mixture was cooled very quickly by immersion of the reaction flask in an ice bath, the passage of steam through the reaction mixture being continued until a temperature of about 125 degrees C. was reached. The steam was then shut off but the rapid cooling or refrigeration of the reaction mixture was continued until a temperature of about 60 degrees C. or 70 degrees C. was reached, after which the reaction mass was permitted to cool in the atmosphere. Products were obtained having excellent color and odor adapting the same for use particularly in the cosmetic industry.

In our present application, we take advantage of the novel features described in our copending application above identified, although, as will be pointed out, the present invention is based upon somewhat broader grounds and upon additional observations and discoveries.

For reasons not fully understood, the hydrophillic derivatives of lauric acid or lauryl alcohol almost invariably are most useful and possess the greatest wetting-out or surface modifying properties of any compounds in any homologous series. Thus, for example, in the case of the alkyl sulphates, lauryl sulphate appears to be outstanding, and in the case of the sulphuric derivatives of the condensation products of monoethanolamine with higher molecular weight carboxylic acids, the lauric acid derivatives possess the greatest wetting-out properties. In this connection, reference may be made to Patent No. 1,981,792. Whatever may be the reasons for this phenomenon, those skilled in the art recognize the validity of the statements made herein.

We have found, surprisingly enough, that in the case of the condensation products of triethanolamine and lauric acid or other higher molecular weight fatty acids, wherein esters are produced, the general rule does not obtain. Contrariwise, we have found that the caprylic acid esters of triethanolamine, particularly the mono-ester or products containing substantial proportions of the mono-ester, possess outstanding wetting-out properties, much superior to those of the corresponding lauric acid esters. Thus, for example, in the Draves test, using 0.1%, in water, of the monolauric acid ester of triethanolamine neutralized to a pH of about 4.4 with hydrochloric acid, the sinking time was 11 minutes and 15 seconds. The same test, performed in identically the same way, with the monocaprylic acid ester of triethanolamine showed a sinking time of 1 minute and 25 seconds. That the caprylic acid esters of triethanolamine should exhibit better wetting-out properties than the corresponding lauric acid esters is in itself surprising, but to find that the former are so vastly superior to the later is entirely unexpected. It will be understood that in all cases, the caprylic acid esters contemplated by the present invention contain at least one and preferably two free or unesterified triethanolamine hydroxy groups.

While the caprylic acid esters may be produced by heating caprylic acid, its esters, halides or anhydrides or any other derivative which will condense with triethanolamine to form caprylic acid esters therewith, in the open atmosphere, under vacuo or in the presence of an inert gas such as carbon dioxide or nitrogen, we have obtained especially satisfactory results by employing the reaction conditions described in our previously mentioned copending application and it will, therefore, be understood that such represents a definitely preferred embodiment.

As illustrative of methods of preparing the caprylic acid esters of triethanolamine, we admixed 1350 grams of 98% triethanolamine, 864 grams of technical caprylic acid, and 0.8 grams of potassium hydroxide, heated the mixture to about 125 degrees C. and then passed steam at 100 degrees C. directly into the reaction mixture, heat being applied to the latter to maintain it within the range of 170 degrees C.-250 degrees C. for 1½ hours. The reaction mixture was then cooled very quickly by immersion of the reaction flask in an ice bath, the passage of steam into the reaction mixture being continued until a temperature of about 125 degrees C. was reached. The steam was then shut off but the quick cooling or refrigeration was continued until a temperature of about 60 degrees C. or 70 degrees C. was reached after which the product was allowed to cool in the atmosphere. The final product comprised in the main the mono-caprylic acid ester of triethanolamine and was an oily, medium amber colored liquid. It may be washed with water to free it of excess or unreacted triethanolamine and may be salted out. If desired the caprylic ester of triethanolamine may be removed from the reaction mass by distillation in vacuo.

It will be appreciated that it is not necessary to employ pure triethanolamine or pure caprylic acid, commercial sources of such compounds being entirely satisfactory. Furthermore, instead of using the free acid, esters thereof may be employed in the reaction, for example, mono-caprylin, dicaprylin, and the like. In other cases, acyl halides of caprylic acid may be employed, it being understood that, in such case, the reaction is carried out in the absence of moisture and preferably in the presence of a basic material to absorb the evolved halogen acid. In still other cases, the anhydride of caprylic acid may be utilized to produce caprylic acid esters of triethanolamine in accordance with general reaction conditions known in the art.

The products produced in accordance with the present invention are basic in reaction and may, therefore, be neutralized with acids or acidic materials of diverse character for various purposes such as, for example, to increase their water-solubility. Such acids and acidic substances include hydrochloric acid, sulphuric acid, phosphoric acids, tartaric acid, citric acid, malic acid, hydrobromic acid, lactic acid, phthalic acid, oleic acid, stearic acid, lauric acid, and the like.

It will be apparent that the caprylic acid esters of triethanolamine need not be employed in the pure state.

The caprylic acid esters of triethanolamine may be used in treating baths containing an aqueous medium, with or without an additional substance, such as, for example, alkali, mordants, dyes, color discharging reagents, hydrogen peroxide, color reducing agents, and other reagents or substances commonly used in treating baths, and the treating bath so formed may be employed with improved results in many of the arts in which interface modification or wetting-out action is desired. For example, dyeing, bleaching, scouring, and otherwise treating fabrics and fibers and other materials in the treatment baths of this character are productive of excellent results. Also in the stuffing of leather, dyeing and otherwise treating furs, and in many other arts, a treating bath employing the materials of our invention may be used. In the flotation of ores, our invention may be used in connection with other reagents to modify the interface between the finely divided ore and the aqueous medium. The products of our invention may also be employed with effective results in cosmetic preparations such as cold creams, vanishing creams, lipsticks, skin lotions, and shaving creams of all types.

What we claim as new and desire to protect by Letters Patent of the United States is:

1. The class consisting of the free reaction products and salts of reaction products having a light color and being characterized by substantial freedom from odor and resulting from the reaction of triethanolamine and a member selected from the group consisting of caprylic acid and esters thereof, at temperatures in excess of 100 degrees C. while passing steam through the reaction mass, and then rapidly cooling the reacting mixture while maintaining a steam atmosphere at least until partial temperature reduction has been effected.

2. Inorganic acid salts of the reaction products of claim 1.

3. The class consisting of hydrochloric, sulphuric, and phosphoric acid salts of the reaction products of claim 1.

4. A product having good wetting-out properties consisting essentially of a member selected from the group consisting of the mono-caprylic acid ester of triethanolamine and salts thereof.

5. Inorganic acid salts of the product of claim 4.

6. Chemical compounds selected from the group consisting of caprylic acid esters of triethanolamine and salts thereof, said esters and their salts containing at least one free triethanolamine hydroxy group.

ALBERT K. EPSTEIN.
MORRIS KATZMAN.